(12) United States Patent
Linhardt et al.

(10) Patent No.: US 11,008,413 B1
(45) Date of Patent: May 18, 2021

(54) BIOCOMPATIBLE MATERIALS FOR UNDERLID DEVICE FABRICATION

(71) Applicant: Verily Life Sciences LLC, Mountain View, CA (US)

(72) Inventors: Jeffrey George Linhardt, Mountain View, CA (US); Daniel Barrows, Mountain View, CA (US); Hojr Pisheh, Mountain View, CA (US)

(73) Assignee: Verily Life Sciences LLC, Mountain View, CA (US)

( * ) Notice: Subject to any disclaimer, the term of this patent is extended or adjusted under 35 U.S.C. 154(b) by 71 days.

(21) Appl. No.: 15/923,055

(22) Filed: Mar. 16, 2018

Related U.S. Application Data

(60) Provisional application No. 62/473,360, filed on Mar. 18, 2017.

(51) Int. Cl.
    *G02B 1/04*     (2006.01)
    *C08F 230/08*     (2006.01)

(52) U.S. Cl.
    CPC ............ *C08F 230/08* (2013.01); *G02B 1/043* (2013.01)

(58) Field of Classification Search
    CPC ..................................................... G02B 1/043
    See application file for complete search history.

(56) References Cited

U.S. PATENT DOCUMENTS

| 5,073,616 A | * | 12/1991 | Futamura | C08F 226/10 |
| | | | | 526/245 |
| 2006/0063852 A1 | * | 3/2006 | Iwata | G02B 1/043 |
| | | | | 523/106 |
| 2006/0141186 A1 | | 6/2006 | Janssen et al. | |
| 2008/0239237 A1 | | 10/2008 | Ansell et al. | |
| 2009/0145086 A1 | | 6/2009 | Reynolds et al. | |
| 2010/0233457 A1 | * | 9/2010 | Kato | C08J 9/122 |
| | | | | 428/220 |
| 2012/0022180 A1 | * | 1/2012 | Linhardt | A61L 27/52 |
| | | | | 523/107 |
| 2013/0274371 A1 | * | 10/2013 | Higgs | C08F 220/56 |
| | | | | 523/107 |
| 2015/0282743 A1 | * | 10/2015 | Etzkorn | G01N 27/3271 |
| | | | | 600/345 |

FOREIGN PATENT DOCUMENTS

WO     WO-2013110911 A1 *   8/2013  ........... C08F 226/02

* cited by examiner

*Primary Examiner* — Michael F Pepitone
(74) *Attorney, Agent, or Firm* — McDonnell Boehnen Hulbert & Berghoff LLP

(57) ABSTRACT

An eye-mountable composition, an eye-mountable device and a method for making the eye-mountable device are disclosed. In one aspect, an eye-mountable composition is disclosed, which may include a silicone hydrogel having silicon-containing monomer-derived units and hydrophilic monomer-derived units, a non-silicone hydrogel having non-silicon-containing hydrophobic monomer-derived units and hydrophilic monomer-derived units, or an elastomer. The composition is biocompatible, does not adhere to ocular tissue, and has a modulus of elasticity of 0.2 MPa to 10 MPa. Also provided is an eye mountable device including an electronics platform embedded in an eye-mountable composition, and a method for fabricating the eye-mountable device.

12 Claims, 2 Drawing Sheets

BIOCOMPATIBLE MATERIALS FOR UNDERLID DEVICE FABRICATION

BACKGROUND

Unless otherwise indicated herein, the materials described in this section are not prior art to the claims in this application and are not admitted to be prior art by inclusion in this section.

The continuous or semi-continuous monitoring of physiological parameters has applications in many areas of modern medicine. Electrochemical-based sensors are believed to be particularly suitable for the monitoring and quantification of analytes (e.g., glucose) in bodily fluid samples (e.g., blood, tear film, urine or interstitial fluid samples). The use of an electrochemical-based sensor that employs an analyte sensing component, (e.g., an enzyme) in conjunction with an electrode(s) allows for the quantification of an analyte in a liquid sample by detecting the product(s) produced from the reaction of the analyte sensing component and the analyte.

To build such an analyte sensor for detection of an analyte in tear film, it is desirable to incorporate the device in a polymeric composition that satisfies specific technical criteria, including (1) flexibility (2) permeability, (3) biocompatibility, and (4) a desirable modulus of elasticity. Conventional analyte sensors that are currently on the market do not meet all four of these technical criteria.

SUMMARY

In one aspect, the present disclosure provides an eye-mountable composition including a silicone hydrogel having silicon-containing monomer-derived units and hydrophilic monomer-derived units, where the silicone hydrogel has a modulus of elasticity of 0.2 MPa to 10 MPa, and a water content of 5 weight percent to 90 weight percent. In another embodiment, the composition includes a non-silicone hydrogel having non-silicon-containing hydrophobic monomer-derived units and hydrophilic monomer-derived units, where the non-silicone hydrogel has a modulus of elasticity of 0.2 MPa to 10 MPa, and a water content of 5 weight percent to 90 weight percent. In another embodiment, the eye-mountable composition includes an elastomer, such as a silicone elastomer, a thermoplastic elastomer, or hydrophobic monomeric units that form an elastomeric solid, where the elastomer has a modulus of elasticity of 0.2 MPa to 10 MPa.

In another aspect, the present disclosure provides an eye-mountable device including an electronics platform embedded in an eye-mountable composition. The device may include a power supply, a controller, bio-interactive electronics, which may include an analyte sensor, and a communication antenna mounted on a substrate embedded in an eye-mountable composition.

In another aspect, the present disclosure provides a method for fabricating the eye-mountable device. The method includes forming a monomer mixture, depositing the monomer mixture on an electronics platform, and curing the monomer mixture to provide the eye-mountable device.

These as well as other aspects, advantages, and alternatives, will become apparent to those of ordinary skill in the art by reading the following detailed description, with reference where appropriate to the accompanying drawings.

DETAILED DESCRIPTION

Figure 1A:
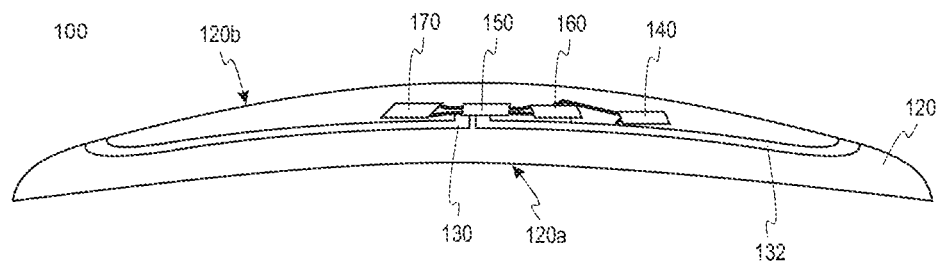
FIG. 1A illustrates a view of an example configuration for an underlid device, according to aspects of the present disclosure.

The following detailed description describes various features and functions of the disclosed methods, apparatus, and systems with reference to the accompanying figures. In the figures, similar symbols typically identify similar components, unless context dictates otherwise. The illustrative method, apparatus, and system embodiments described herein are not meant to be limiting. It will be readily understood that certain aspects of the disclosed methods, apparatus, and systems can be arranged and combined in a wide variety of different configurations, all of which are contemplated herein.

As used herein, the term "alkyl" includes alkyl, alkenyl and alkynyl groups of a designed number of carbon atoms, such as 1 to 12 carbons (i.e., inclusive of 1 and 12), 1 to 6 carbons, 1 to 3 carbons, or 1, 2, 3, 4, 5, 6, 7, 8, 9, 10, 11 or 12. The term "$C_m$-$C_n$alkyl" means an alkyl group having from m to n carbon atoms (i.e., inclusive of m and n). The term "$C_m$-$C_n$alkyl" means an alkyl group having from m to n carbon atoms. For example, "$C_1$-$C_6$alkyl" is an alkyl group having from one to six carbon atoms. Alkyl and alkyl groups may be straight or branched and depending on context, may be a monovalent radical or a divalent radical (i.e., an alkylene group). In the case of an alkyl or alkyl group having zero carbon atoms (i.e., "$C_0$alkyl"), the group is simply a single covalent bond if it is a divalent radical or is a hydrogen atom if it is a monovalent radical. For example, the moiety "—($C_0$-$C_6$alkyl)-Ar" signifies connection of an optionally substituted aryl through a single bond or an alkylene bridge having from 1 to 6 carbons. Examples of "alkyl" include, for example, methyl, ethyl, propyl, isopropyl, butyl, iso-, sec- and tert-butyl, pentyl, hexyl, heptyl, 3-ethylbutyl, 3-hexenyl and propargyl. If the number of carbon atoms is not specified, the subject "alkyl" moiety has from 1 to 12 carbons.

The term "alkoxy" as used herein, means an alkyl group, as defined herein, appended to the parent molecular moiety through an oxygen atom. Representative examples of alkoxy include, but are not limited to, methoxy, ethoxy, propoxy, 2-propoxy, butoxy, tert-butoxy, pentyloxy, and hexyloxy.

The term "halogen" as used herein, means —Cl, —Br, —I or —F.

The term "haloalkyl" as used herein, means at least one halogen, as defined herein, appended to the parent molecular moiety through an alkyl group, as defined herein. Representative examples of haloalkyl include, but are not limited to, chloromethyl, 2-fluoroethyl, trifluoromethyl, pentafluoroethyl, and 2-chloro-3-fluoropentyl.

The term "haloalkoxyl" as used herein, means at least one halogen, as defined herein, appended to the parent molecular moiety through an alkoxy group, as defined herein. Representative examples of haloalkoxyl include, but are not limited to, chloromethoxy, 2-fluoroethoxy, trifluoromethoxy, pentafluoroethoxy, and 2-chloro-3-fluoropentoxy.

As used herein, any recitation of "(meth)acrylate" includes acrylate and methacrylate. For example, a di(meth)acrylate-derived monomeric unit may be a diacrylate-derived monomeric unit or a dimethacrylate-derived monomeric unit.

In one aspect, the present disclosure provides an eye-mountable composition including a silicone hydrogel having
silicon-containing monomer-derived units and
hydrophilic monomer-derived units,
wherein the silicone hydrogel has a water content of 5 weight percent to 90 weight percent, and a modulus of elasticity of 0.2 MPa to 10 MPa.

In another aspect, the present disclosure provides and eye-mountable composition including a non-silicone hydrogel having
non-silicon-containing hydrophobic monomer-derived units and
hydrophilic monomer-derived units,
wherein the non-silicone hydrogel has a water content of 5 weight percent to 90 weight percent, and a modulus of elasticity of 0.2 MPa to 10 MPa.

Hydrogels are a well-known class of materials that comprise hydrated, cross-linked polymeric systems containing water in an equilibrium state. For proper compatibility with ocular tissue, both the silicon- and non-silicon-containing hydrogel can have a water content of about 5 weight percent to about 90 weight percent. The water content of the hydrogel can be varied to balance the mechanical strength and signal sensitivity (i.e., permeability) of the polymer composition, as well as to alter other properties, such as flexibility, wearer comfort, surface wettability, and lack of adhesion to ocular tissue. In some examples, the water content of the hydrogel can individually be 15 weight percent to 90 weight percent. For example, the water content of the hydrogel can individually be 15 weight percent to 85 weight percent, 15 weight percent to 80 weight percent, 15 weight percent to 75 weight percent, 15 weight percent to 70 weight percent, 15 weight percent to 65 weight percent, 15 weight percent to 60 weight percent, 15 weight percent to 55 weight percent, 15 weight percent to 50 weight percent, 15 weight percent to 45 weight percent, 15 weight percent to 40 weight percent, 15 weight percent to 35 weight percent, 15 weight percent to 30 weight percent, 15 weight percent to 25 weight percent, or 15 weight percent to 20 weight percent. In other embodiments, the water content of the hydrogels can individually be 20 weight percent to 60 weight percent, 20 weight percent to 40 weight percent, 25 weight percent to 50 weight percent, 30 weight percent to 60 weight percent, 30 weight percent to 50 weight percent, 40 weight percent to 80 weight percent, 40 weight percent to 60 weight percent, 50 weight percent to 90 weight percent or 50 weight percent to 80 weight percent.

Silicon-containing hydrogels can be prepared by polymerizing a mixture including at least one silicon-containing monomer and at least one hydrophilic monomer, and a crosslinking agent. Typically, either the silicon-containing monomer or the hydrophilic monomer functions as a cross-linking agent (a crosslinker being defined as a monomer having multiple polymerizable functionalities) or a separate crosslinker may be employed. Applicable silicon-containing monomer-derived units for use in the formation of silicon-containing hydrogels are well known in the art.

Examples of applicable silicon-containing monomer-derived units include bulky polysiloxanylalkyl(meth)acrylic monomers. An example of such monofunctional, bulky polysiloxanylalkyl(meth)acrylic monomers are represented by the following Formula I

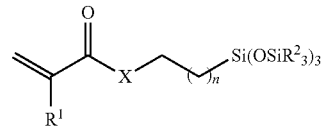

wherein
$R^1$ is independently hydrogen or methyl;
X is —O— or —NR—;
n is 0 to 10; and
each $R^2$ independently is $C_1$-$C_6$ alkyl, phenyl or —Si($R^2$)$_3$, wherein each $R^2$ is independently $C_1$-$C_6$ alkyl or phenyl.

In some embodiments, silicon-containing vinyl carbonate or vinyl carbamate monomers can be represented by Formula II:

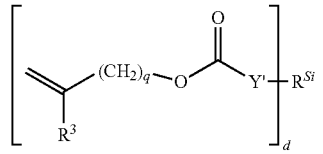

wherein:
Y' is —O—, —S— or —NH—;
$R^{Si}$ is a silicon-containing organic radical;
$R^3$ is hydrogen or methyl;
d is 1, 2, 3 or 4; and
q is 0 or 1.

Suitable silicon-containing organic radicals ($R^{Si}$) include —(CH$_2$)n'Si[(CH$_2$)m'CH$_3$]$_3$, —(CH$_2$)n'Si[OSi(CH$_2$)m'CH$_3$]$_3$, —(CH$_2$)n'[Si($R^5$)$_2$O]$_e$$R^4$, —(CH$_2$)n'Si(OSi$R^5{}_3$)$_3$, —(CH$_2$)n'[Si($R^5$)$_2$O]$_e$Si$R^5{}_3$, wherein:
$R^4$ is

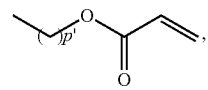

wherein p' is 1 to 6;
$R^5$ is $C_1$-$C_6$ alkyl or $C_1$-$C_6$ fluoroalkyl having 1 to 6 carbon atoms;
e is 1 to 200;
n' is 1, 2, 3 or 4; and
m' is 0, 1, 2, 3, 4 or 5.

An example of a particular species within Formula II is represented by Formula III:

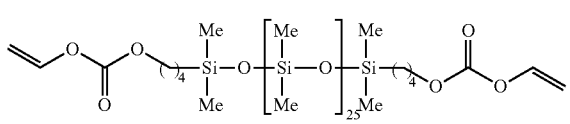

In some embodiments, the silicon-containing monomer-derived units are derived from silicon-containing methacrylates such as: 3-methacryloxypropyl tris(trimethyl-siloxy) silane, tris(trimethylsiloxy)silylpropyl methacrylate (TRIS), 3-[Tris(trimethylsiloxy)silyl]propyl methacrylate, 3-(Trimethoxysilyl)propyl methacrylate, or (Trimethylsilyl) methacrylate Tributylsilyl methacrylate. In other embodiments, the silicon-containing monomer-derived units are derived from silicon-containing vinyl carbonate or vinyl carbamate monomers such as: 1,3-bis[4-vinyloxycarbonyloxy)but-1-yl]tetramethyldisiloxane; 1,3-bis[4-vinyloxycarbonyloxy)but-1-yl]polydimethylsiloxane; 3-(trimethylsilyl) propyl vinyl carbonate; 3-(vinyloxycarbonylthio)propyl[tris (trimethylsiloxy)silane]; 3-[tris(trimethylsiloxy)silyl]propyl vinyl carbamate; 3-[tris(trimethylsiloxy)silyl]propyl allyl carbamate; 3-[tris(trimethylsiloxy)silyl]propyl vinyl carbonate; t-butyldimethylsiloxyethyl vinyl carbonate; trimethylsilylethyl vinyl carbonate; and trimethylsilylmethyl vinyl carbonate.

In some embodiments, the silicon-containing hydrogel material comprises (in the bulk monomer mixture that is copolymerized) 5 to 50 percent, or 10 to 25, by weight of one or more silicon-containing macromonomers, 5 to 75 percent, or 30 to 60 percent, by weight of one or more polysiloxanylalkyl (meth)acrylic monomers, and 10 to 50 percent, or 20 to 40 percent, by weight of a hydrophilic monomer. In general, the silicon-containing macromonomer can be a poly(organosiloxane) capped with an unsaturated group at two or more ends of the molecule. The unsaturated groups may include acryloxy or methacryloxy. Fumarate-containing materials known in the art are also useful substrates in accordance with the invention. In some embodiments, the silane macromonomer is a silicon-containing vinyl carbonate or vinyl carbamate or a polyurethane-polysiloxane having one or more hard-soft-hard blocks and end-capped with a hydrophilic monomer.

Suitable hydrophilic monomers used to form the silicon-containing hydrogels include monomers that, once polymerized, can form a homogeneous material when copolymerized with the silicon-containing monomers or macromers. Examples of useful monomers include amides such as dimethylacrylamide, dimethylmethacrylamide, cyclic lactams such as n-vinyl-2-pyrrolidone and poly(alkene glycols) functionalized with polymerizable groups. Examples of useful functionalized poly(alkene glycols) include poly (diethylene glycols) of varying chain length containing monomethacrylate or dimethacrylate end caps. In some embodiments, the poly(alkene glycol) polymer includes at least two alkene glycol monomeric units. Still further examples include hydrophilic vinyl carbonate or vinyl carbamate monomers and hydrophilic oxazolone monomers known in the art. In some embodiments, the hydrophilic monomers may be selected from any of the following:

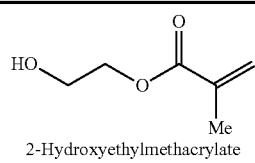
2-Hydroxyethylmethacrylate

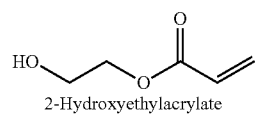
2-Hydroxyethylacrylate

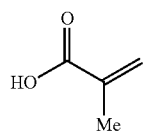
Methacrylic Acid

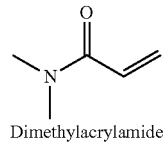
Dimethylacrylamide

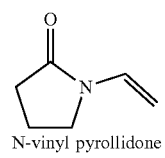
N-vinyl pyrollidone

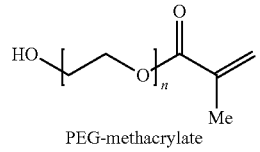
PEG-methacrylate

The hydrophobic monomer-derived units of the non-silicone hydrogel and the hydrophilic monomer-derived units of the hydrogel may include one or more di(meth) acrylate-derived units. The one or more (meth)acrylate-derived monomeric units may be selected from an alkyl (meth)acrylate-derived monomeric unit, a fluorinated methacrylate-derived monomeric unit and a silicon-containing methacrylate-derived monomeric unit. In some embodiments, the one or more (meth)acrylate-derived monomeric units include an alkyl methacrylate-derived monomeric unit and an alkylene oxide (meth)acrylate-derived monomeric unit. In other embodiments, the one or more (meth)acrylate-derived monomeric units comprise an alkyl methacrylate-derived monomeric unit, an alkylene oxide (meth)acrylate-derived monomeric unit and a fluorinated methacrylate-derived monomeric unit. In other embodiments, the one or more (meth)acrylate-derived monomeric units include an alkyl methacrylate-derived monomeric unit, an alkylene oxide (meth)acrylate-derived monomeric unit, a fluorinated methacrylate-derived monomeric unit and a silicon-containing methacrylate-derived monomeric unit.

The (meth)acrylate-derived monomeric unit may be derived from an alkyl (meth)acrylate. The alkyl (meth) acrylate may include an alkyl group having 1 to 4 carbon atoms per group, for example, methyl methacrylate, ethyl methacrylate, propyl methacrylate, iso-propyl methacrylate, iso-butyl methacrylate, sec-butyl methacrylate, methyl acrylate, ethyl acrylate, propyl acrylate, iso-propyl acrylate, iso-butyl acrylate and sec-butyl acrylate. In some embodiments, the (meth)acrylate-derived monomeric unit is derived from methyl methacrylate.

In other embodiments, the hydrophobic monomer-derived units of the non-silicone hydrogel is:

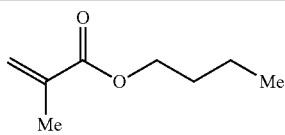

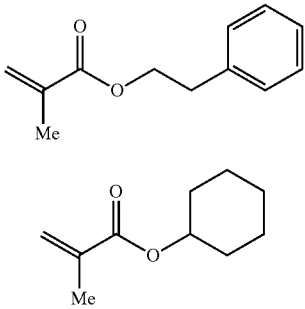

In other embodiments, the (meth)acrylate-derived monomeric unit may be derived from a carbocyclic (meth)acrylate. The carbocyclic (meth)acrylate may include a cycloalkyl or aryl group having 3 to 10 carbon atoms per group, where the cycloalkyl or aryl group is optionally substituted with an alkyl group. For example, the carbocyclic may be cyclohexyl methacrylate, tert-butyl cyclohexyl methacrylate, phenyl methacrylate or naphthyl methacrylate.

In other embodiments, the (meth)acrylate-derived monomeric unit may be derived from a alkyl-carbocyclic (meth)acrylate. The alkyl-carbocyclic (meth)acrylate may include an alkyl group having 1 to 4 carbon atoms and a cycloalkyl or aryl group having 3 to 10 carbon atoms per group, where the cycloalkyl or aryl group is optionally substituted with an alkyl group. For example, the alkyl-carbocyclic (meth) acrylate may be benzyl methacrylate.

The alkylene oxide (meth)acrylate-derived monomeric unit may be derived from a alkylene oxide-containing (meth)acrylate. The alkylene oxide group may be a single alkylene oxide group (e.g., —CH$_2$CH$_2$—O—), or a poly(alkylene oxide) (e.g., poly(ethylene oxide). In some embodiments, the alkylene oxide group has the formula (—(CH$_2$)$_n$—O—)$_m$, where n is 2, 3 or 4, and m is 0, 1, 2, 3, 4, 5, 6, 7, 8, 9 or 10. In other embodiments, m is such that the number average molecular weight (Mn) of the alkylene oxide group (—(CH$_2$)$_n$—O—)$_m$ is about 100 to about 10,000. The alkylene oxide-containing (meth)acrylate may be capped or uncapped. For example, the uncapped alkylene oxide-containing (meth)acrylate may be poly(ethylene glycol) methacrylate, where the corresponding capped alkylene oxide-containing (meth)acrylate may be poly(ethylene glycol) methyl ether methacrylate. Examples of poly(ethylene glycol) (meth)acrylates include poly(ethylene glycol) methacrylate, poly(ethylene glycol) methyl ether methacrylate, poly(ethylene glycol) acrylate, poly(ethylene glycol) methyl ether acrylate, o-phenylphenol ethyl acrylate and hydroxyethyl propyl methacrylate. In some embodiments, the alkylene oxide (meth)acrylate-derived monomeric unit is derived from o-phenylphenol ethyl acrylate.

In some embodiments, the fluorinated (meth)acrylate monomeric unit may be derived from a (meth)acrylate containing at least one fluorine atom. For example, the fluorinated(meth)acrylate monomeric unit may be derived from 2,2,3,3,4,4,5,5,6,6,7,7-Dodecafluoroheptyl acrylate, 3,3,4,4,5,5,6,6,7,7,8,8,9,9,10,10,11,11,12,12-Heneicosafluorododecyl acrylate, 3,3,4,4,5,5,6,6,7,7,8,8,9,9,10,10,10-Heptadecafluorodecyl methacrylate, 2,2,3,3,4,4,4-Heptafluorobutyl acrylate, 2,2,3,3,4,4,4-Heptafluorobutyl methacrylate, 2,2,3,3,4,4,4-Hexafluorobutyl acrylate, 2,2,3,4,4,4-Hexafluorobutyl methacrylate, 1,1,1,3,3,3-Hexafluoroisopropyl acrylate, 1,1,1,3,3,3-Hexafluoroisopropyl methacrylate, 2,2,3,3,4,4,5,5-Octafluoropentyl acrylate, 2,2,3,3,4,4,5,5-Octafluoropentyl methacrylate, 2,2,3,3,3-Pentafluoropropyl acrylate, 2,2,3,3,3-Pentafluoropropyl methacrylate, 1H,1H,2H,2H-Perfluorodecyl acrylate, 2,2,3,3-Tetrafluoropropyl methacrylate, 3,3,4,4,5,5,6,6,7,7,8,8,8-Tridecafluorooctyl acrylate, 3,3,4,4,5,5,6,6,7,7,8,8,8-Tridecafluorooctyl methacrylate, 2,2,2-Trifluoroethyl methacrylate, 1,1,1-Trifluoro-2-(trifluoromethyl)-2-hydroxy-4-methyl-5-pentyl methacrylate or 2-[(1',1',1'-Trifluoro-2'-(trifluoromethyl)-2'-hydroxy)propyl]-3-norbornyl methacrylate. In some embodiments, the fluorinated (meth)acrylate monomeric unit is derived from 1,1,1,3,3,3-Hexafluoroisopropyl methacrylate.

The hydrophilic monomer-derived units of the hydrogel may also include one or more di(meth)acrylate-derived monomeric unit. The di(meth)acrylate-derived monomeric unit may be derived from a di(meth)acrylate having two (meth)acrylate groups covalently bound through a linker. The linker may be hydrophilic or hydrophobic. Hydrophilic linkers may include at least one hydrophilic functional group, which include, but are not limited to, hydroxy, carboxylic acid, carboxylic salt, amine, amide and alkylene oxide functionalities. For example, the hydrophilic di(meth)acrylate may be poly(ethylene glycol) dimethacrylate.

The di(meth)acrylate may be present as 1 weight percent to 35 weight percent of the hydrogel monomer mixture used to make the hydrogel. In some embodiments, the di(meth)acrylate may be present as 5 weight percent to 30 weight percent, 10 weight percent to 25 weight percent, 15 weight percent to 20 weight percent of the monomer mixture.

In some embodiments, the hydrogel monomer mixture includes 15 weight percent to 30 weight percent of one or more di(meth)acrylate-derived monomeric unit and 60 weight percent to 85 weight percent of one or more (meth)acrylate-derived monomeric units.

In some embodiments, the hydrogel monomer mixture includes 15 weight percent to 30 weight percent of one or more di(meth)acrylate, 40 weight percent to 55 weight percent of one or more (meth)acrylate, and 20 weight percent to 30 weight percent of one or more fluorinated (meth)acrylate.

In some embodiments, the hydrogel monomer mixture includes 15 weight percent to 30 weight percent of one or more di(meth)acrylate, 15 weight percent to 25 weight percent of one or more methacrylate, 25 weight percent to 30 weight percent of one or more acrylate, and 20 weight percent to 30 weight percent of one or more fluorinated (meth)acrylate.

In some embodiments, the hydrogel monomer mixture includes 15 weight percent to 30 weight percent of one or more di(meth)acrylate, 5 weight percent to 15 weight percent of one or more alkyl methacrylate, 10 weight percent to 20 weight percent of one or more silicon-containing methacrylate, 25 weight percent to 30 weight percent of one or more acrylate and 20 weight percent to 30 weight percent of one or more fluorinated (meth)acrylate.

Other suitable hydrophilic monomers will be apparent to one skilled in the art.

In other embodiments, the silicon-containing monomer-derived units of the hydrogel may include a polydimethylsiloxane-containing di(meth)acrylate-derived monomeric unit derived from polydimethylsiloxane (PDMS). The polydimethylsiloxane-containing di(meth)acrylate may have a linker substituted with at least one dimethylsiloxane group (—Si(R$_2$)—O—), where each R is independently selected from alkyl, —(C$_0$-C$_6$alkyl)-Ar, haloalkyl, alkoxy, haloalkoxy, halogen, —OR and —OSiR$_3$. The di(meth)acrylate portion of the polydimethylsiloxane-containing di(meth)acrylate may be any di(meth)acrylate defined herein where at least one bond is replaced with —Si(R$_2$)—O—. For example, the polydimethylsiloxane-containing di(meth)acrylate may be methacryloxypropyl terminated polydimethylsiloxane. In some embodiments, the polydimethylsiloxane-containing di(meth)acrylate-derived monomeric unit is derived from methacryloxypropyl terminated polydimethylsiloxane 8-14 cSt. In some embodiments, the silicon-containing monomer-derived unit is derived from any of the following polydimethylsiloxanes:

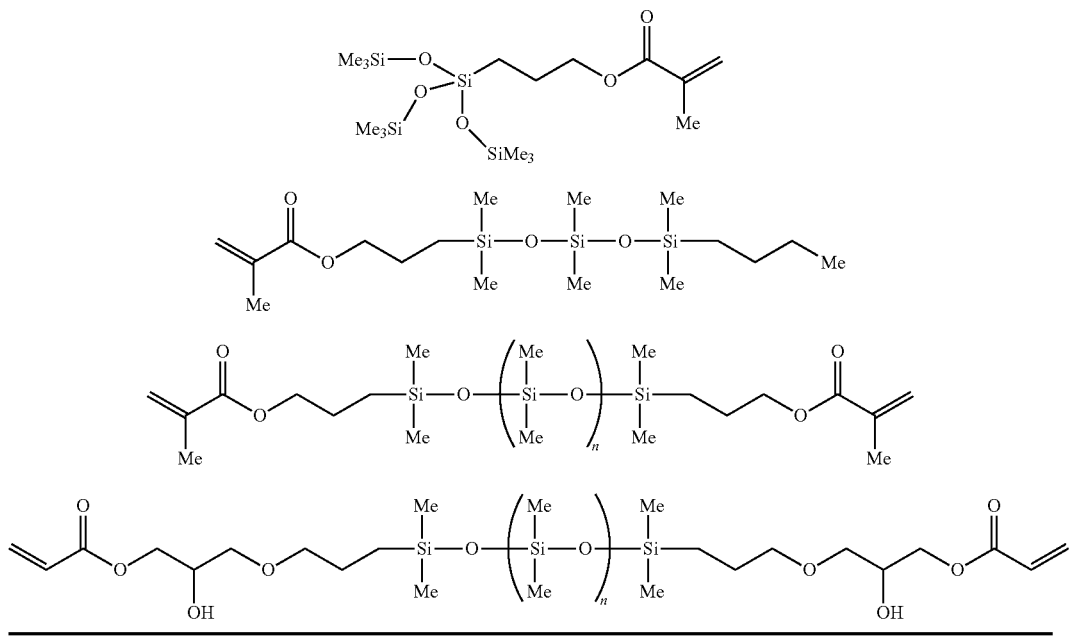

In some embodiments, the polydimethylsiloxane-containing di(meth)acrylate may be present as 10 weight percent to 20 weight percent of the monomer mixture. In some embodiments, the polydimethylsiloxane-containing di(meth)acrylate may be present as 10 weight percent to 15 weight percent, 15 weight percent to 20 weight percent, 10 weight percent to 12 weight percent, 10 weight percent to 14 weight percent, 10 weight percent to 16 weight percent, 10 weight percent to 18 weight percent, 12 weight percent to 20 weight percent, 12 weight percent to 18 weight percent, 12 weight percent to 16 weight percent, 12 weight percent to 14 weight percent, 14 weight percent to 20 weight percent, 14 weight percent to 18 weight percent, 14 weight percent to 16 weight percent, 16 weight percent to 20 weight percent, or 16 weight percent to 18 weight percent of the monomer mixture.

The non-silicon-containing hydrophobic monomer-derived units of hydrogel can include a (meth)acrylate-derived unit having a hydrophobic side chain. In some embodiments, the hydrophobic side chain can be alkyl, such as linear or branched $C_{12}$alkyl; fluoroalkyl, such as linear or branched $C_{12}$alkyl where one or more hydrogens are replaced with fluoro; $C_{0-4}$alkylcycloalkyl, such as cyclopentyl, cyclohexyl, methyl-cyclopentyl or methyl-cyclohexyl; $C_{0-4}$alkylaryl, such as phenyl, methyl-phenyl or ethyl-phenyl. In other embodiments, the non-silicon-containing hydrophobic monomer-derived units of the hydrogel can include a cross-linking agent having a hydrophobic crosslinker. For example, the non-silicon-containing hydrophobic monomer-derived units of the hydrogel can be derived from a dimethacrylate having a hydrophobic linker. For example, the non-silicon-containing hydrophobic monomer-derived units of the hydrogel may be derived from dimethacrylates such as 1,4-phenylene dimethacrylate, 1,3-butanediol dimethacrylate, 1,6-hexanediol dimethacrylate or 1,10-decamethylene glycol dimethacrylate:

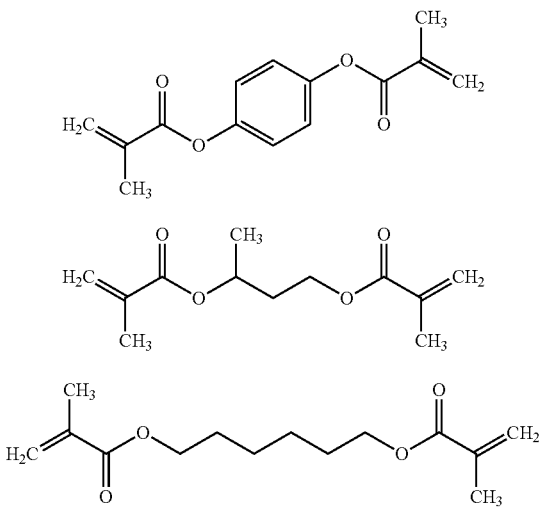

-continued

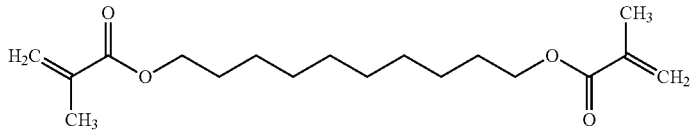 [SMILES: C=C(C)C(=O)OCCCCCCCCCCOC(=O)C(=C)C]

In another aspect, the present disclosure provides and eye-mountable composition including an elastomer having a modulus of elasticity of 0.2 MPa to 10 MPa.

The elastomer may be a substance emulating natural rubber in that it may stretch under tension, have a high tensile strength, retract rapidly, and substantially recover its original dimensions. The elastomer can include a silicone elastomer, a thermoplastic elastomer, a hydrophobic acrylic or a mixture thereof. The silicone elastomer can be a hydrophobic material having good mechanical properties and flexibility. The thermoplastic elastomer can be a copolymer or mix of polymers including materials with both thermoplastic and elastomeric properties. In some embodiments, the thermoplastic elastomer is crosslinked. The hydrophobic acrylic can be an (meth)acrylate-derived unit having a hydrophobic side chain. In some embodiments, the hydrophobic side chain can be alkyl, such as linear of branched $C_{12}$ alkyl.

In some embodiments, the silicone elastomer includes polyurethane-polysiloxane macromonomers, which may have hard-soft-hard blocks like traditional urethane elastomers. Examples of silicone urethane monomers are represented by Formulae IV and V:

wherein:
D is $C_1$-$C_6$ alkyl, $C_1$-$C_6$ alkylcycloalkyl, cycloalkyl, aryl or an $C_6$-$C_{30}$ alkylaryl;
G is $C_1$-$C_6$ alkyl, $C_1$-$C_6$ alkylcycloalkyl, cycloalkyl, aryl or an $C_1$-$C_{40}$ alkylaryl, which may include ether, thio or amine linkages in the main chain;
* is a urethane or ureido linkage;
a is at least 1;

A is of Formula VI:

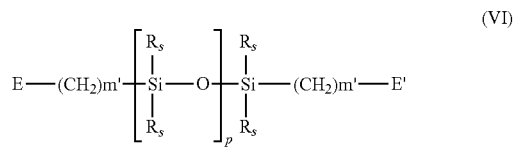

wherein:
each $R_s$ is independently $C_1$-$C_6$ alkyl or $C_1$-$C_6$ fluoroalkyl having 1 to 10 carbon atoms which may include ether linkages between carbon atoms;
m' is at least 1;
p is a number which provides a moiety weight of 400 to 10,000;
each of E and E' is independently of Formula VII:

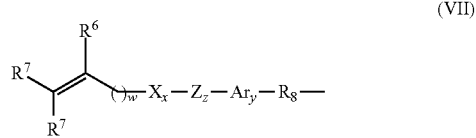

wherein:
$R^6$ is hydrogen or methyl;
each $R^7$ is hydrogen, $C_1$-$C_6$ alkyl, or —C(O)—Y—$R^9$, wherein Y is —O—, —S— or —NH—;
$R^8$ is a $C_1$-$C_{10}$ alkyl;
$R^9$ is $C_1$-$C_{12}$ alkyl;
X is —C(O)— or —OC(O)—;
Z is —O— or —NH—;
Ar denotes an aromatic system having 6 to 30 carbon atoms;
w is 0 to 6;
x is 0 or 1;
y is 0 or 1; and
z is 0 or 1.

A more specific example of a silicon-containing urethane monomer is represented by Formula (VIII):

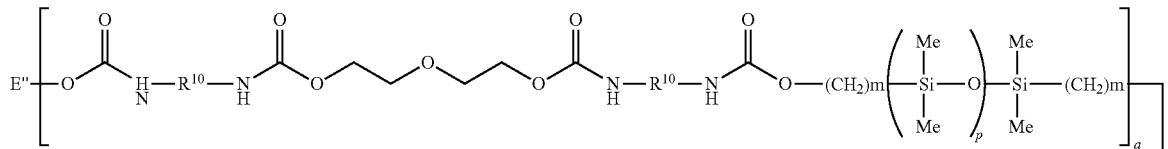

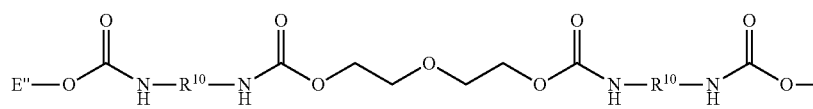

wherein
   m is 1, 2, 3 or 4;
   a is 1, 2, 3 or 4;
   p is a number which provides a moiety weight of 400 to 10,000,
   or p is at least 30;
   $R^{10}$ is a diradical of a diisocyanate after removal of the isocyanate group, such as the diradical of isophorone diisocyanate; and
   each E" is:

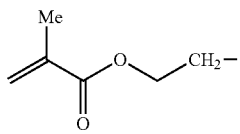

In some embodiments, the elastomer can include a copolymer of hydrophobic monomeric units. The hydrophobic monomeric units can be derived from polymerizable, hydrophobic olefins, such as styrene and alkyldienes, For example, the elastomer can be styrene-isoprene-butadiene-styrene (SIBS).

In an example, the elastomer can include:

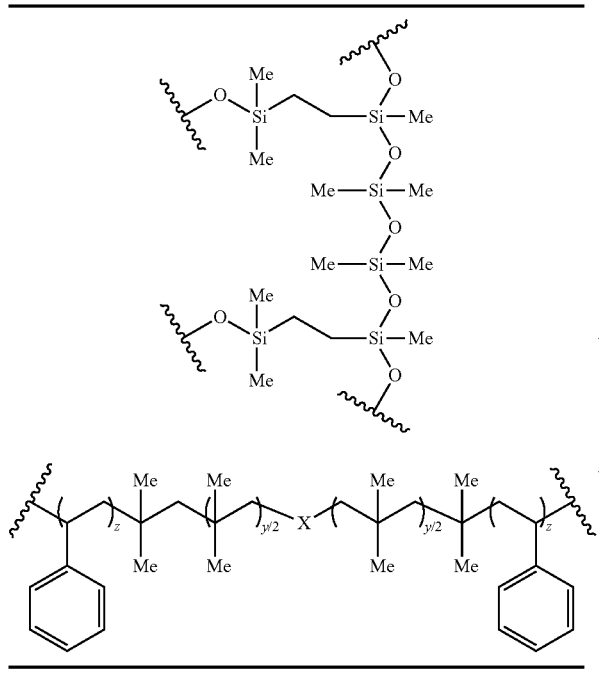

Figure 2A:
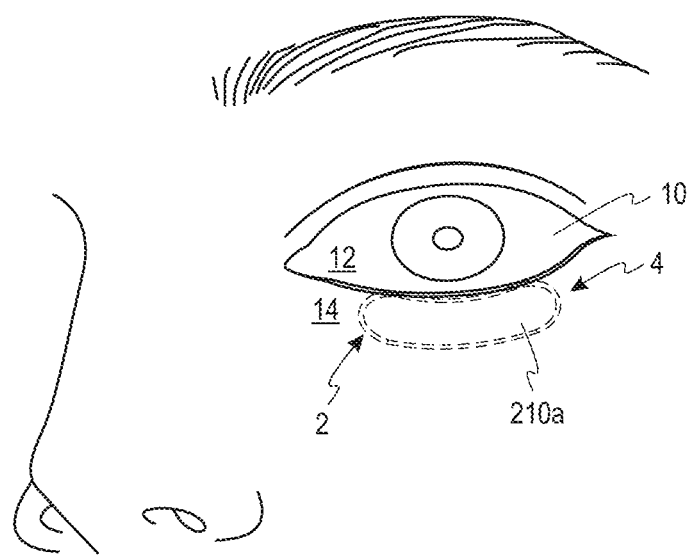
FIG. 2A illustrates an example implementation of an eye-mountable device as an underlid device that fits between a lower eyelid and a surface of the eye, according to aspects of the present disclosure.
Figure 2B:
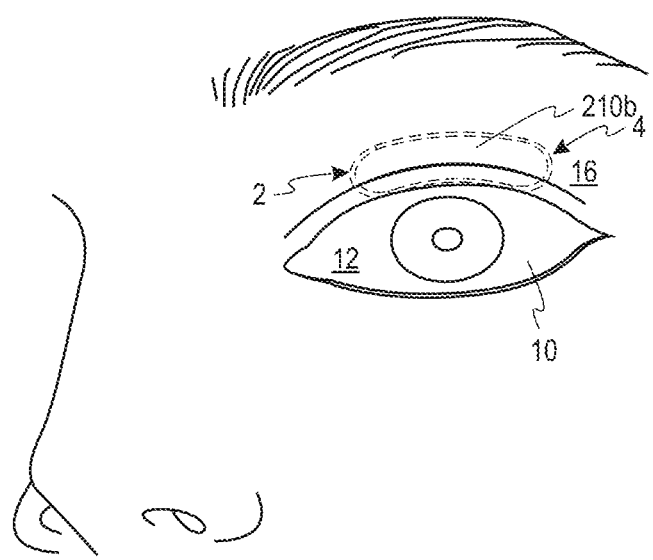
FIG. 2B illustrates another example implementation of an eye-mountable device as an underlid device that fits between an upper eyelid and a surface of the eye, according to aspects of the present disclosure.

In some embodiments, the eye-mountable composition is biocompatible and does not adhere to ocular tissue. The term "biocompatible," as used herein, means being biologically compatible by not producing a toxic, injurious, or immunological response in living tissue. The term "adhere," as used herein, refers to the ability of the composition to bind, cling, stick, or attach to ocular tissue. The composition is intended to allow the eye-mountable device to reside in the underlid region (fornix) of the eye while being readily removable and not causing irritation or injury to the ocular tissue. For example, as depicted in FIGS. 2A and 2B, the underlid devices 210a and 210b are shaped so that they can fit stably and comfortably in the space between the surface 12 of the eye 10 and the lower eyelid 14 or the upper eyelid 16, respectively. In particular, the underlid devices 210a and 210b may have a bean-shaped ("curved ellipse") profile that follows the contours at the lower or upper regions of the eye 10, respectively. The width of the underlid devices 210a and 210b from a nasal side 2 to a temporal side 4 may be approximately 10 mm, for example.

In some embodiments, the surface of the eye-mountable composition is wettable. As used herein, "wettable" refers to the tendency of a fluid to spread onto or adhere to the surface of the eye-mountable composition. Wettability can be determined by measuring the contact angle of a fluid on the surface of the eye-mountable composition. "Wettable," as used herein, is defined as a surface that has a static water contact angle less than or equal to 80 degrees (deionized water).

For proper compatibility with ocular tissue, the composition can have a Modulus of elasticity of 0.2 MPa to 10 MPa. In some embodiments, the Modulus of elasticity can be varied to provide the desired flexibility and wearer comfort. For example, the composition may have a Modulus of elasticity of 0.2 MPa to 10 MPa, or 0.2 MPa to 9 MPa, or 0.2 MPa to 8 MPa, or 0.2 MPa to 7 MPa, or 0.2 MPa to 6 MPa, or 0.2 MPa to 5 MPa, or 0.2 MPa to 4 MPa, or 0.2 MPa to 3 MPa, or 0.2 MPa to 2 MPa, or 0.2 MPa to 1 MPa. In some embodiments, the composition may have a Modulus of elasticity of 0.3 MPa to 10 MPa, or 0.3 MPa to 9 MPa, or 0.3 MPa to 8 MPa, or 0.3 MPa to 7 MPa, or 0.3 MPa to 6 MPa, or 0.3 MPa to 5 MPa, or 0.3 MPa to 4 MPa, or 0.3 MPa to 3 MPa, or 0.3 MPa to 2 MPa, or 0.3 MPa to 1 MPa. In other embodiments, the composition can have a Modulus of elasticity of 0.5 MPa to 10 MPa, or 0.5 MPa to 9 MPa, or 0.5 MPa to 8 MPa, or 0.5 MPa to 7 MPa, or 0.5 MPa to 6 MPa, or 0.5 MPa to 5 MPa, or 0.5 MPa to 4 MPa, or 0.5 MPa to 3 MPa, or 0.5 MPa to 2 MPa, or 0.5 MPa to 1 MPa. In some embodiments, the composition may have a Modulus of elasticity of 1 MPa to 10 MPa, or 1 MPa to 9 MPa, or 1 MPa to 8 MPa, or 1 MPa to 7 MPa, or 1 MPa to 6 MPa, or 1 MPa to 5 MPa, or 1 MPa to 4 MPa, or 1 MPa to 3 MPa, or 1 MPa to 2 MPa.

FIG. 1A illustrates certain aspects of the underlid device 210a. The general shape of the underlid device 210a is defined by the eye-mountable composition 120 as described herein. Additionally, the underlid device 210a can have a concave posterior surface 120a that follows that contour of the surface 12 of the eye 10 so that the underlid device 210a can maintain contact.

The underlid device 210a also includes a substrate 130 that provides one or more surfaces for mounting a power supply 140, a controller 150, bio-interactive electronics 160, and a communication antenna 170.

The substrate 130 may follow the contour of the anterior side 120b of the eye-mountable device 100. The substrate 130 includes a supporting ring 132 that runs along a periphery of the eye-mountable device 100 to support the mounted elements. For instance, the width of the supporting ring 132 may be approximately 1 mm. As shown in greater detail in FIG. 1B, the supporting ring 132 of the substrate 130 also has a bean-shaped profile to correspond with the shape of the eye-mountable composition 120.

The substrate 130 is sufficiently thick to provide sufficient structural support for the mounted elements; however, the substrate 130 can also be embedded in the eye-mountable composition 120 without influencing the profile of the eye-mountable device 100. For instance, the substrate 130 may have a thickness of approximately 50 μm. According to some embodiments, the eye-mountable composition 120 may include one or more polymer layers. For instance, the substrate 130 may be disposed between a first polymer layer and a second polymer layer.

The substrate 130 also includes a mounting platform 134 that extends from the supporting ring 132 into an opening 133 defined by the supporting ring 132. The power supply 140, the controller 150, the bio-interactive electronics 160, and the communication antenna 170 are mounted onto the mounting platform 134. The bio-interactive electronics 160 is mounted in a position where the analyte bio-sensor 160 can maintain sufficient contact with the tear film outside the underlid device 210a. Correspondingly, an opening is provided in the eye-mountable composition 120 to expose the analyte bio-sensor 160 to the tear film.

Figure 1B:
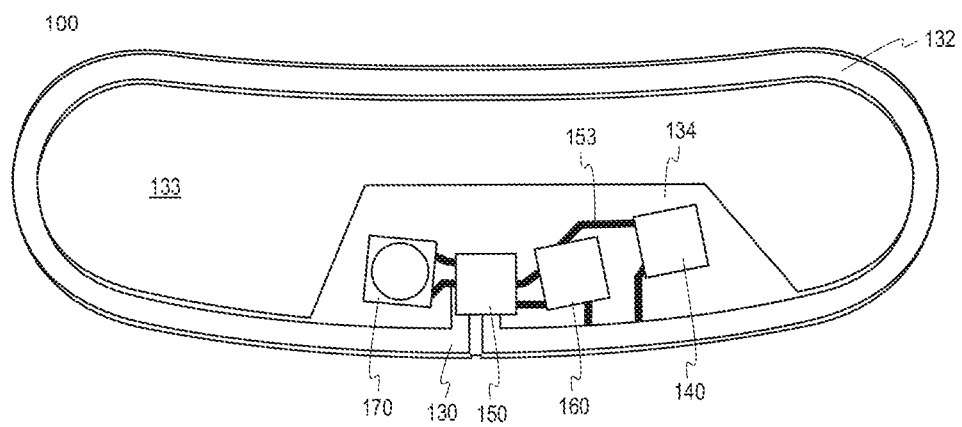
FIG. 1B illustrates another view of the example configuration for the underlid device of FIG. 1A, according to aspects of the present disclosure.

As described above, the power supply 140, the controller 150, the bio-interactive electronics 160, and the communication antenna 170 may be electrically connected via interconnects, which are shown collectively in FIG. 1B as reference numeral 153. In general, the substrate 130 may be employed for chip-based circuitry (e.g., by flip-chip mounting) and/or for patterning conductive materials (e.g., gold, platinum, palladium, titanium, copper, aluminum, silver, metals, other conductive materials, combinations of these, etc.) to create electrodes, interconnects, antennae, etc. The interconnects 153 which may formed by depositing suitable patterns of conductive materials on the substrate 130. A combination of resists, masks, and deposition techniques may be employed to pattern materials on the substrate 130.

Although FIGS. 1A and 1B illustrate aspects of the underlid device 210a, aspects of the underlid device 210b can be understood from the description of the underlid device 210a.

In some embodiments, the bio-interactive electronics 160 may include an amperometric electrochemical sensor that includes a working electrode and a reference electrode. Application of an appropriate voltage between the working and reference electrodes causes an analyte in the biological environment to undergo electrochemical reactions (e.g., reduction and/or oxidation reactions) at the working electrode and to generate an amperometric current. The amperometric current may depend on the concentration of the analyte in the biological environment, and thus the amount of amperometric current can provide an indication of analyte concentration. In some embodiments, the bio-interactive electronics 160 may include a potentiostat configured to apply a voltage difference between the working and reference electrodes while measuring a current through the working electrode.

The electrodes of the electrochemical sensor can be formed from any type of conductive material and can be patterned by any process that be used for patterning such materials, such as deposition or photolithography, for example. The conductive materials can be, for example, gold, platinum, palladium, titanium, carbon, copper, silver/silver-chloride, conductors formed from noble materials, metals, or any combinations of these materials. Other materials can also be envisioned.

In some embodiments, the eye-mountable device can include a sensor configured to monitor health-related information based on one or more analytes detected in a tear film (the term "tear film" is used herein interchangeably with "tears" and "tear fluid") of a user wearing the eye-mountable device. For example, the eye-mountable device can be in the form of a device that resides in the underlid region (fornix) of the eye. The eye-mountable device can also be configured to monitor various other types of health-related information.

The analyte sensor may include an analyte sensing component selected to monitor physiological levels of a specific analyte. For example, glucose, lactate, cholesterol and various proteins and lipids can be found in body fluids, including, for example, tear film, and can be indicative of medical conditions that can benefit from continuous or semi-continuous monitoring.

The analyte sensing component can be an enzyme selected to monitor one or more analytes. For example, physiological cholesterol levels can be monitored with cholesterol oxidase, lactate levels with lactate oxidase, and glucose levels with glucose oxidase or glucose dehydrogenase (GDH).

In some embodiments, the analyte sensing component can be an enzyme that undergoes a chemical reaction with an analyte to produce detectable reaction products. For example, a copolymer including glucose oxidase ("GOx") can be situated around the working electrode to catalyze a reaction with glucose to produce hydrogen peroxide ($H_2O_2$). As shown below, the hydrogen peroxide can then be oxidized at the working electrode to release electrons to the working electrode, which generates a current.

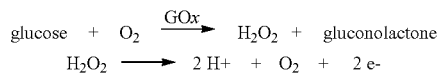

The current generated by either reduction or oxidation reactions can be approximately proportionate to the reaction rate. Further, the reaction rate can be dependent on the rate of analyte molecules reaching the electrochemical sensor electrodes to fuel the reduction or oxidation reactions, either directly or catalytically through a reagent. In a steady state, where analyte molecules diffuse to the electrochemical sensor electrodes from a sampled region at approximately the same rate that additional analyte molecules diffuse to the sampled region from surrounding regions, the reaction rate can be approximately proportionate to the concentration of the analyte molecules. The current can thus provide an indication of the analyte concentration.

In other embodiments, the analyte sensing component can be glucose dehydrogenase (GDH). In certain instances, the use of GDH can include the addition of a cofactor such as flavin adenine dinucleotide (FAD), nicotinamide adenine dinucleotide (NAD), flavin mononucleotide, pyrroloquinoline quinone (PQQ) or a coenzyme.

In another aspect, the present disclosure provides a method for fabricating an eye-mountable device. The method involves:
  (a) forming a monomer mixture;
  (b) depositing the monomer mixture on an electronics platform; and
  (c) curing the monomer mixture to provide the eye-mountable device.

In some embodiments of the method, the monomer mixture is formed from monomers selected to provide the eye-mountable composition described herein. For example, an eye-mountable device having an electronics platform embedded in a silicone hydrogel may be formed from a monomer mixture including a silicon-containing monomer and a hydrophilic monomer. Similarly, an eye-mountable device having an electronics platform embedded in a non-silicone hydrogel may be formed from a monomer mixture including non-silicon-containing hydrophobic monomer and a hydrophilic monomer. An eye-mountable device having an electronics platform embedded in an elastomer may be formed from a monomer mixture including elastomer precursor.

Further, some embodiments of the eye-mountable device may include privacy controls which may be automatically implemented or controlled by the wearer of the eye-mountable device. For example, where a wearer's collected physiological parameter data and health state data are uploaded to a cloud computing network for trend analysis by a clinician, the data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined.

Additionally or alternatively, wearers of the eye-mountable device may be provided with an opportunity to control whether or how the device collects information about the wearer (e.g., information about a user's medical history, social actions or activities, profession, a user's preferences, or a user's current location), or to control how such information may be used. Thus, the wearer may have control over how information is collected about him or her and used by a clinician or physician or other user of the data. For example, a wearer may elect that data, such as health state and physiological parameters, collected from his or her device may only be used for generating an individual baseline and recommendations in response to collection and comparison of his or her own data and may not be used in generating a population baseline or for use in population correlation studies.

EXAMPLES

Example 1: Conventional Hydrogels

Conventional hydrogels were formed with the following composition:

| Material | Conventional Hydrogels | | | | | | | |
|---|---|---|---|---|---|---|---|---|
| | CH#1 | CH#2 | CH#3 | CH#4 | CH#5 | CH#6 | CH#7 | CH#8 |
| HEMA | 60.0 | 45.0 | 30.0 | 15.0 | 56.0 | 56.0 | 45.0 | 35.0 |
| NVP | 0.0 | 35.0 | 50.0 | 65.0 | 0.0 | 0.0 | 0.0 | 0.0 |
| Methacrylic Acid | 0.0 | 0.0 | 0.0 | 0.0 | 4.0 | 8.0 | 0.0 | 0.0 |
| MPC | 0.0 | 0.0 | 0.0 | 0.0 | 0.0 | 0.0 | 15.0 | 25.0 |
| 1,2-propanediol | 40.0 | 15.0 | 15.0 | 15.0 | 0.0 | 0.0 | 0.0 | 36.0 |
| Tert-butanol | 0.0 | 0.0 | 0.0 | 0.0 | 36.0 | 36.0 | 36.0 | 0.0 |
| Cyclohexyl methacrylate | 0.0 | 8.0 | 8.0 | 8.0 | 0.0 | 0.0 | 0.0 | 0.0 |
| EGDMA | 0.5 | 0.5 | 0.5 | 0.5 | 0.5 | 0.5 | 0.5 | 0.5 |
| AMA | 0.3 | 0.3 | 0.3 | 0.3 | 0.3 | 0.3 | 0.3 | 0.3 |
| Irgacure 819 | 0.5 | 0.5 | 0.5 | 0.5 | 0.5 | 0.5 | 0.5 | 0.5 |

All parts in the table above are considered parts by weight so the total parts of a formulation can add to over 100 parts.
Acronyms used in the table are:
HEMA, 2-Hydroxy ethyl methacrylate;
NVP, 1-Vinyl-2-pyrrolidinone;
MPC, 2-Methacryloyloxyethyl phosphorylcholine;
EGDMA, Ethylene glycol dimethacrylate;
AMA, Allyl methacrylate.

Example 2: Silicone Hydrogels

Silicone hydrogels were formed with the following composition:

| Material | Silicone Hydrogels | | | | | | | |
|---|---|---|---|---|---|---|---|---|
| | SH#1 | SH#2 | SH#3 | SH#4 | SH#5 | SH#6 | SH#7 | SH#8 |
| TRIS | 30.0 | 33.0 | 37.0 | 40.0 | 35.0 | 40.0 | 45.0 | 50.0 |
| NVP | 40.0 | 37.0 | 33.0 | 30.0 | 35.0 | 30.0 | 25.0 | 20.0 |
| HEMA | 5.0 | 5.0 | 5.0 | 5.0 | 5.0 | 5.0 | 5.0 | 5.0 |
| DMA | 5.0 | 5.0 | 5.0 | 5.0 | 5.0 | 5.0 | 5.0 | 5.0 |
| Hexanol | 15.0 | 15.0 | 15.0 | 15.0 | 0.0 | 0.0 | 0.0 | 0.0 |
| Tert-butanol | 0.0 | 0.0 | 0.0 | 0.0 | 30.0 | 30.0 | 30.0 | 30.0 |
| MCR-M11 | 15.0 | 15.0 | 13.0 | 13.0 | 15.0 | 15.0 | 10.0 | 10.0 |
| DMS-R18 | 10.0 | 10.0 | 9.0 | 9.0 | 0.0 | 0.0 | 15.0 | 15.0 |
| DMS-R11 | 0.0 | 0.0 | 0.0 | 0.0 | 10.0 | 10.0 | 0.0 | 0.0 |
| Irgacure 819 | 0.5 | 0.5 | 0.5 | 0.5 | 0.5 | 0.5 | 0.5 | 0.5 |

All parts in the table above are considered parts by weight so the total parts of a formulation can add to over 100 parts.
Acronyms used in the table are:
TRIS, tris-(trimethylsiloxy)silypropyl methacrylate;
NVP, 1-Vinyl-2-pyrrolidinone;
HEMA, 2-Hydroxy ethyl methacrylate;
DMA, N,N-Dimethylacrylamide;
MCR-M11, monomethacryloxypropyl terminated polydimethylsiloxane (MW ~800-1000);
DMS-R18, methacryloxypropyl terminated polydimethylsiloxane (MW ~4,500-5,500);
DMS-R11, methacryloxypropyl terminated polydimethylsiloxane (MW ~900-1,200).

It should be understood that arrangements described herein are for purposes of example only. As such, those skilled in the art will appreciate that other arrangements and other elements (e.g., machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims, along with the full scope of equivalents to which such claims are entitled. It is also to be understood that the terminology used herein is for the purpose of describing particular embodiments only, and is not intended to be limiting.

The invention claimed is:

1. An eye-mountable composition, comprising a non-silicon-containing hydrogel comprising:
   non-silicon-containing hydrophobic monomer-derived units, wherein the non-silicon-containing hydrophobic monomer-derived units comprise (i) an alkylene oxide (meth)acrylate-derived monomeric unit and (ii) a fluorinated methacrylate-derived monomeric unit; and
   hydrophilic monomer-derived units,
   wherein the non-silicon-containing hydrogel includes 15-30 wt. % of one or more di(meth)acrylate-derived monomeric units, and 60-85 wt. % of one or more (meth)acrylate-derived monomeric units; and
   wherein the non-silicon-containing hydrogel has a water content of 5 weight percent to 90 weight percent and a modulus of elasticity of 0.2 MPa to 10 MPa.

2. The eye-mountable composition of claim 1, wherein the hydrogel has a water content of 75 weight percent to 90 weight percent.

3. The eye-mountable composition of claim 1, wherein the composition has a modulus of elasticity of 0.2 MPa to 5 MPa.

4. The eye-mountable composition of claim 1, wherein the composition has a modulus of elasticity of 0.2 MPa to 1 MPa.

5. The eye-mountable composition of claim 1, wherein the non-silicon-containing hydrophobic monomer-derived units of the hydrogel further comprise alkyl-containing (meth)acrylate-derived monomeric units with alkyl groups having 1 to 4 carbon atoms per group.

6. An eye-mountable device, comprising an electronics platform embedded in the eye-mountable composition of claim 1.

7. An eye-mountable composition, comprising:
 an elastomer, wherein the elastomer comprises a silicone elastomer, wherein the silicone elastomer includes polyurethane-polysiloxane macromonomers and styrene-isoprene-butadiene-styrene,
 wherein the composition has a modulus of elasticity of 0.2 MPa to 10 MPa.

8. The eye-mountable composition of claim 7, wherein the elastomer further comprises a hydrophobic acrylic, wherein the hydrophobic acrylic has a (meth)acrylate-derived unit having a hydrophobic side chain.

9. The eye-mountable composition of claim 8, wherein the hydrophobic side chain is linear or branched $C_{12}$alkyl.

10. An eye-mountable device, comprising an electronics platform embedded in the eye-mountable composition of claim 7.

11. A method for fabricating the eye-mountable device of claim 6, method comprising:
 forming a monomer mixture comprising a non-silicon-containing hydrophobic monomer and a hydrophilic monomer;
 depositing the monomer mixture on an electronics platform; and
 curing the monomer mixture to provide the eye-mountable device.

12. A method for fabricating the eye-mountable device of claim 10, the method comprising:
 forming a monomer mixture comprising an elastomer precursor;
 depositing the monomer mixture on an electronics platform; and
 curing the monomer mixture to provide the eye-mountable device.

* * * * *